(12) United States Patent
Lin et al.

(10) Patent No.: US 8,866,794 B2
(45) Date of Patent: Oct. 21, 2014

(54) STATISTICAL ANALYZING METHOD AND STATISTICAL QUALITY INDICATOR FOR RELIABILITY IMPROVEMENT OF A CAPACITIVE TOUCH DEVICE

(75) Inventors: Chia-Hsing Lin, Hsinchu (TW); Po-Hao Kuo, New Taipei (TW); Yi-Hsin Tao, Hsinchu (TW)

(73) Assignee: Elan Microelectronics Corporation, Hsinchu (TW)

( * ) Notice: Subject to any disclaimer, the term of this patent is extended or adjusted under 35 U.S.C. 154(b) by 185 days.

(21) Appl. No.: 13/567,284

(22) Filed: Aug. 6, 2012

(65) Prior Publication Data

US 2013/0249852 A1 Sep. 26, 2013

(30) Foreign Application Priority Data

Mar. 26, 2012 (TW) ............................. 101110353 A (51) Int. Cl.
*G06F 3/045* (2006.01)
(52) U.S. Cl.
USPC ........................................ 345/174; 178/18.06

(58) Field of Classification Search
CPC ......................................................... G06F 3/044
USPC .................................... 345/174; 178/18.06
See application file for complete search history.

(56) References Cited

U.S. PATENT DOCUMENTS

| 2009/0284490 | A1* | 11/2009 | Chen ............................. 345/174 |
| 2010/0139991 | A1* | 6/2010 | Philipp et al. .............. 178/18.06 |
| 2011/0050618 | A1* | 3/2011 | Murphy et al. ............... 345/174 |
| 2011/0148810 | A1* | 6/2011 | Kitada et al. .................. 345/174 |

* cited by examiner

*Primary Examiner* — Hong Zhou
(74) *Attorney, Agent, or Firm* — Muncy, Geissler, Olds & Lowe, P.C.

(57) ABSTRACT

For a capacitive touch device having a capacitive touch sensor to be sensed to generate sensed values, a sensing apparatus and method statistically analyze the sensed values generated in a certain time period to evaluate the sensing quality thereof, discard the poor reliable sensed values, and re-sense the capacitive touch sensor to generate new sensed values, by which the resultant output signal will have improved reliability.

8 Claims, 8 Drawing Sheets

STATISTICAL ANALYZING METHOD AND STATISTICAL QUALITY INDICATOR FOR RELIABILITY IMPROVEMENT OF A CAPACITIVE TOUCH DEVICE

FIELD OF THE INVENTION

The present invention is related generally to a capacitive touch device and, more particularly, to a sensing apparatus and method for a capacitive touch device.

BACKGROUND OF THE INVENTION

A capacitive touch device detects a touch point by sensing the capacitance variation from its capacitive touch sensor, and thus its performance highly depends on the accuracy of the sensed capacitance. In the course of sensing a capacitive touch sensor for capacitance variation, external noise and capacitive coupling between sensor electrodes can affect the sensed value, making a non-contact point be mistaken for a touch point, or leading to abnormal sensed values generated at a non-contact point that feedback incorrect coordinates and in turn causing mis-operation.

Therefore, it is desired a reliability improved sensing apparatus and method for a capacitive touch device.

SUMMARY OF THE INVENTION

An objective of the present invention is to provide a sensing apparatus and method capable of evaluating the sensing quality of a capacitive touch device.

Another objective of the present invention is to provide a sensing apparatus and method for improving the sensing quality of a capacitive touch device.

According to the present invention, a sensing apparatus for a capacitive touch device uses a statistical quality indicator to dynamically perform statistical analysis to the sensed values generated in a statistic cycle, so as to identify the sensing quality and accordingly discard poor reliable sensed values.

According to the present invention, a sensing method for a capacitive touch device dynamically performs statistical analysis to the sensed values generated in a statistic cycle, so as to identify the sensing quality and accordingly discard poor reliable sensed values.

Preferably, when a statistical analysis shows that the sensed values in the statistic cycle have a significantly large deviation or unreasonable values, these sensed values are discarded and re-sensing is performed.

In one embodiment, re-sensing is repeated until a satisfied sensing quality is obtained.

In another embodiment, re-sensing is performed with a different sensing frequency. Preferably, when the number of the successive rounds of re-sensing reaches a preset value, a sensing frequency different from the currently used one is used.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
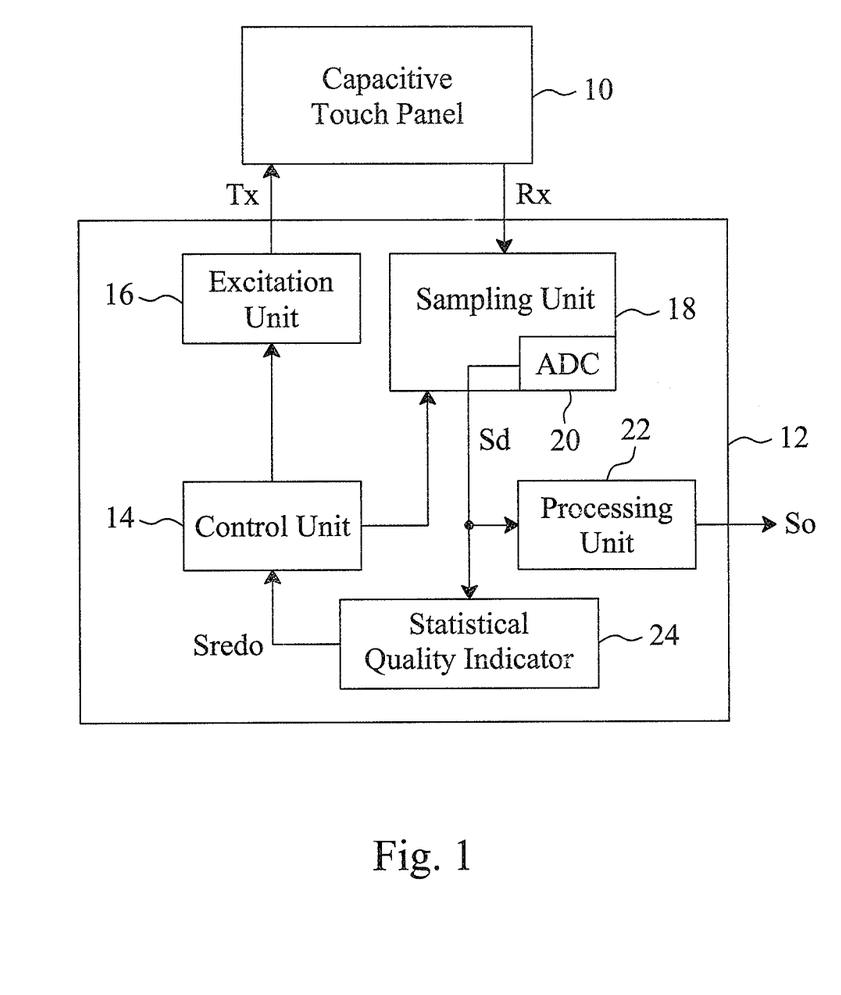
FIG. 1 is a circuit diagram of an embodiment of a sensing apparatus according to the present invention.

Referring to the capacitive touch device shown in FIG. 1, a capacitive touch panel 10 has a capacitive touch sensor (not shown) connected to a sensing apparatus 12. When a finger or another conductive object touches the capacitive touch panel 10, the capacitive touch sensor thereof will have a capacitance variation, which will reflect on an output signal So through the sensing by the sensing apparatus 12. In the sensing apparatus 12, a control unit 14 performs timing control so that an excitation unit 16 applies an excitation signal Tx to the capacitive touch sensor for a sampling unit 18 to sample a sensing signal Rx received from the capacitive touch sensor and an analog-to-digital converter (ADC) 20 to convert the sampled sensing signals Rx into sensed values Sd, and a processing unit 22 processes, for example, average, the sensed values Sd generated in a certain time period to generate a stable output signal So. The excitation unit 16 applying the excitation signal Tx and the sampling unit 18 sampling the sensing signals Rx are performed synchronously and controlled by the control unit 14 based on a sensing frequency. The processing unit 22 is typically realized by a low-pass filter. For improving the reliability of the output signal So, according to the present invention, a statistical quality indicator 24 receives the sensed values Sd from the ADC 20, dynamically performs statistical analysis to the sensed values Sd generated in a statistic cycle, evaluates the sensing quality of the sensed values Sd, and determines to discard the sensed values Sd having poor reliability. When a statistical analysis shows that the sensed values Sd in a statistic cycle contain a large deviation or unreasonable values, the statistical quality indicator 24 triggers a redo signal Sredo to signal the control unit 14 to control the excitation unit 16 and the sampling unit 18 to re-sense the capacitive touch sensor, so that new sensed values Sd will be generated while the previous poor reliable sensed values Sd are discarded. Preferably, the method and setting for the statistical quality indicator 24 to statistically analyze the sensed values Sd depend on the circuit structure of the capacitive touch panel 10 or the characteristics of its capacitive touch sensor, and can be determined by a user through designing oneself or adjusting firmware or software. In one embodiment, upon receiving the redo signal Sredo, the control unit 14 keeps controlling the excitation unit 16 and the sampling unit 18 to re-sense the capacitive touch sensor until sensed values Sd having relatively good reliability are obtained. In another embodiment, upon receiving the redo signal Sredo, the control unit 14 uses a different sensing frequency to control the excitation unit 16 and the sampling unit 18 to re-sense the capacitive touch sensor. Preferably, the control unit 14 or the statistical quality indicator 24 counts the number of the successive rounds of re-sensing the capacitive touch sensor, and the control unit 14 changes the sensing frequency when the number reaches a preset value.

Figure 2:
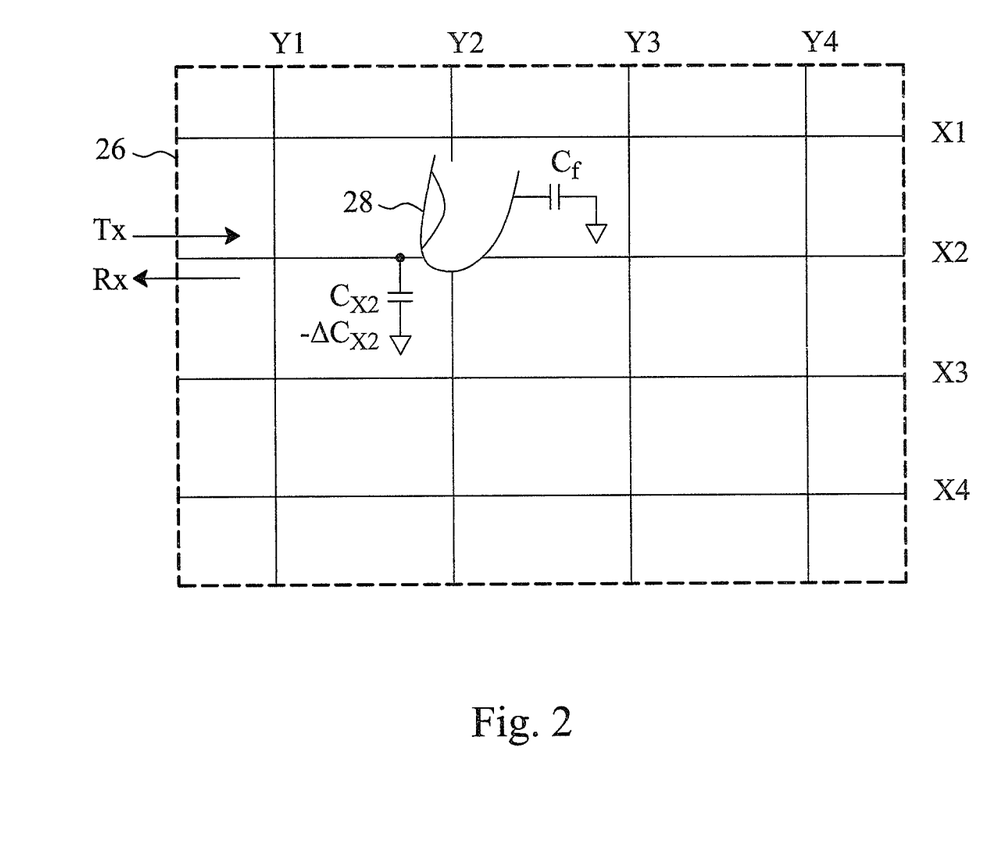
FIG. 2 is a simplified diagram illustrating how to sense a self capacitance.
Figure 3:
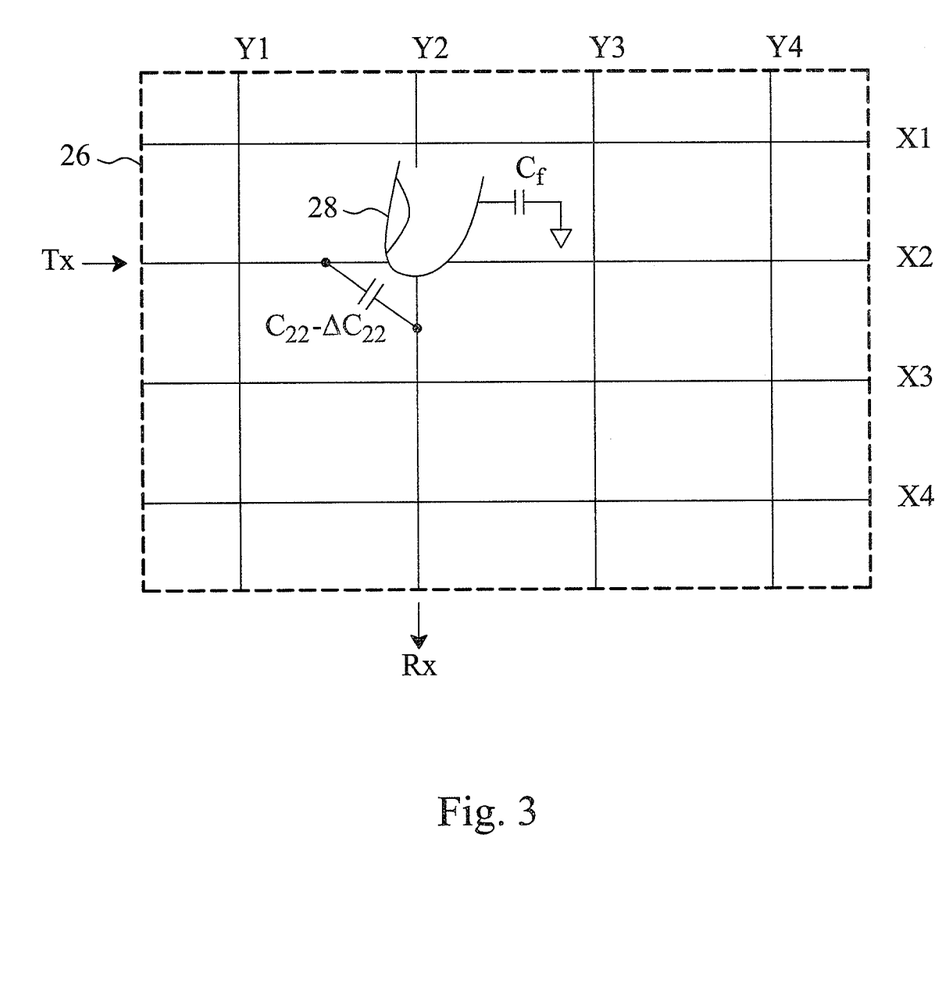
FIG. 3 is a simplified diagram illustrating how to sense a mutual capacitance.
Figure 4:
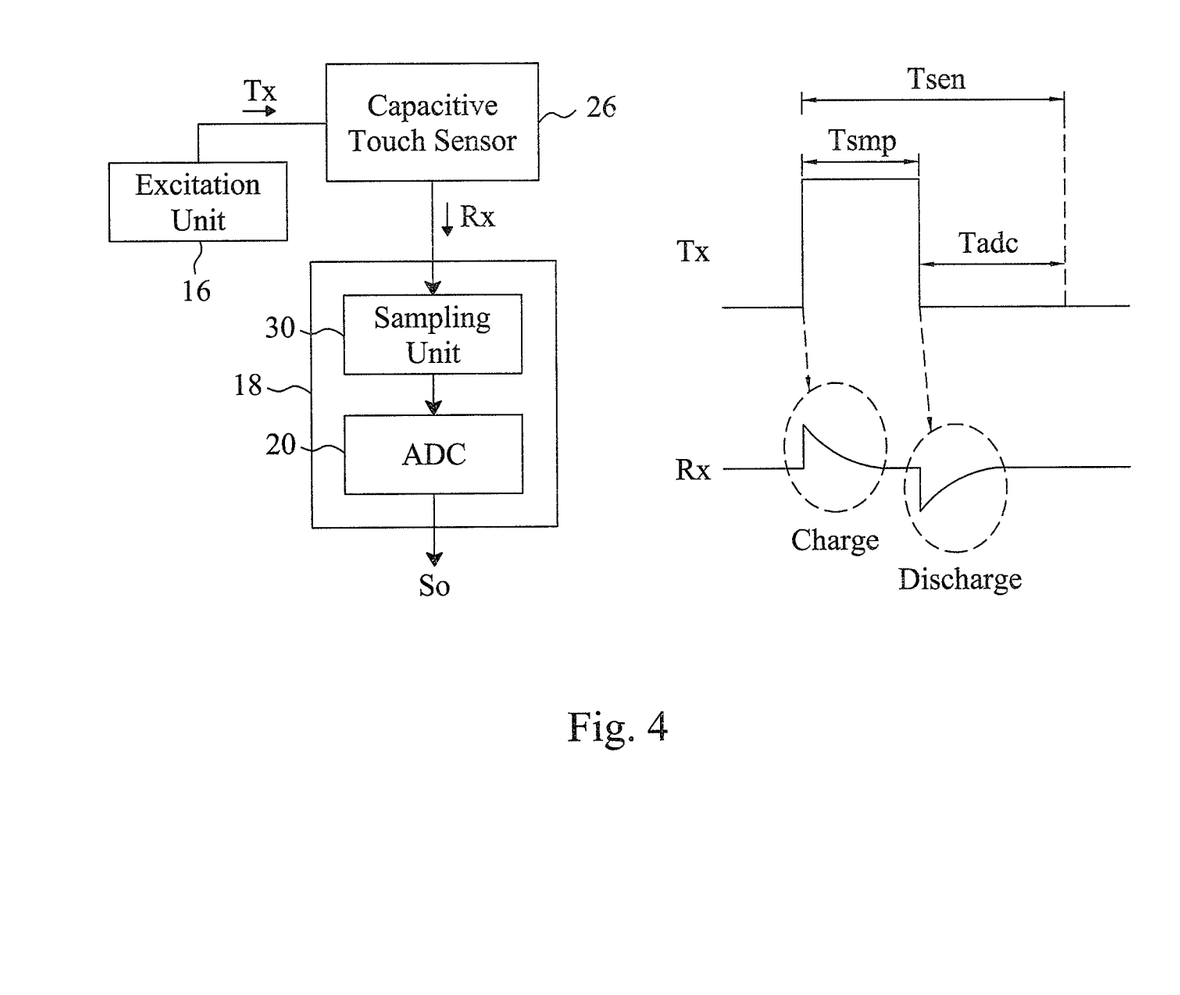
FIG. 4 is a simplified diagram illustrating how to sense a variation in a mutual capacitance.

For sensing the capacitance variation from the capacitive touch sensor, different designs may be used, including self capacitance sensing mode, mutual capacitance sensing mode and the both. For example, as shown in FIG. 2, a capacitive touch sensor 26 has a plurality of sensor electrodes X1-X4 and Y1-Y4 arranged in two directions, and each of the sensor electrodes is electrically independent. For sensing the capacitance variation from a sensor electrode X2 in a self capacitance sensing mode for example, an excitation signal Tx is driven to the sensor electrode X2, and a sensing signal Rx is sensed from the same sensor electrode X2. Since the capacitance $C_f$ of the finger 28 to ground and the capacitance $C_{X2}$ of the sensor electrode X2 to ground are connected in parallel, the sensed capacitance sensing from the sensor electrode X2 will be different from the self capacitance $C_{X2}$ of the sensor electrodes X2, and the difference therebetween may be regarded as a proof that the sensor electrode X2 is touched. FIG. 3 is a simplified diagram illustrating how to sense the variation in a mutual capacitance sensing mode. In this case, an excitation signal Tx is driven into the sensor electrode X2, and a sensing signal Rx is sensed from the sensor electrode Y2. Due to the touch of the finger 28 causing a capacitance variation $\Delta C_{22}$ of the capacitance $C_{22}$ between the sensor electrodes X2 and Y2, it will be identified that the intersection of the sensor electrodes X2 and Y2 is touched. There are many known schemes for exciting and sensing a sensor electrode. For example, FIG. 4 schematically illustrates how to sense a variation in a mutual capacitance sensing mode, in which an excitation signal Tx has a pulse of a constant voltage or a constant current applied to a sensor electrode to induce a voltage variation on another corresponding sensor electrode, and the voltage variation will charge or discharge a sensing capacitor in the sampling circuit 30 to perform charge transfer. The voltage signal or current signal derived from the transferred charge amounts is then converted by the ADC 20 into the sensed value Sd. The sensing time Tsen includes the sampling time Tsmp and the analog-to-digital conversion time Tadc.

Figure 5:
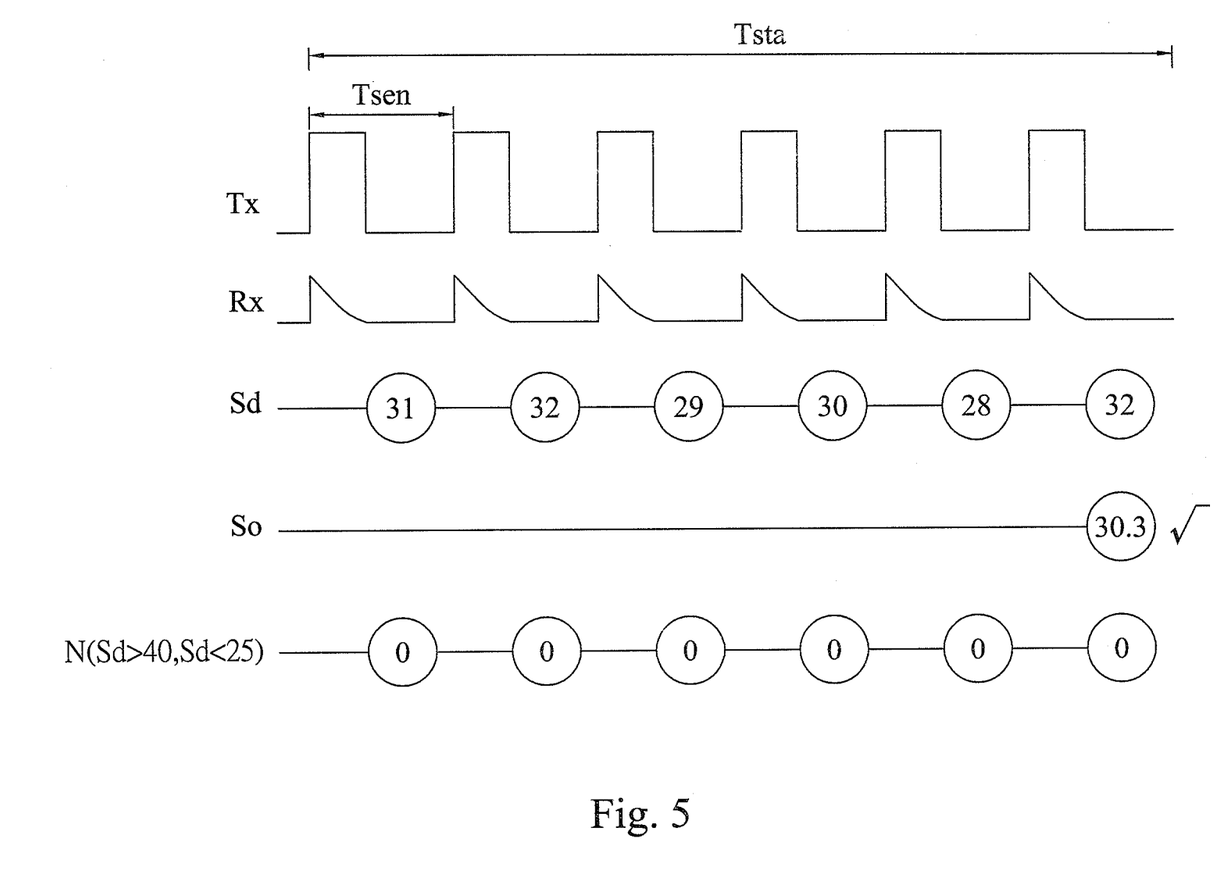
FIGS. 5 and 6 are diagrams illustrating a first embodiment of a sensing method according to the present invention.
Figure 6:
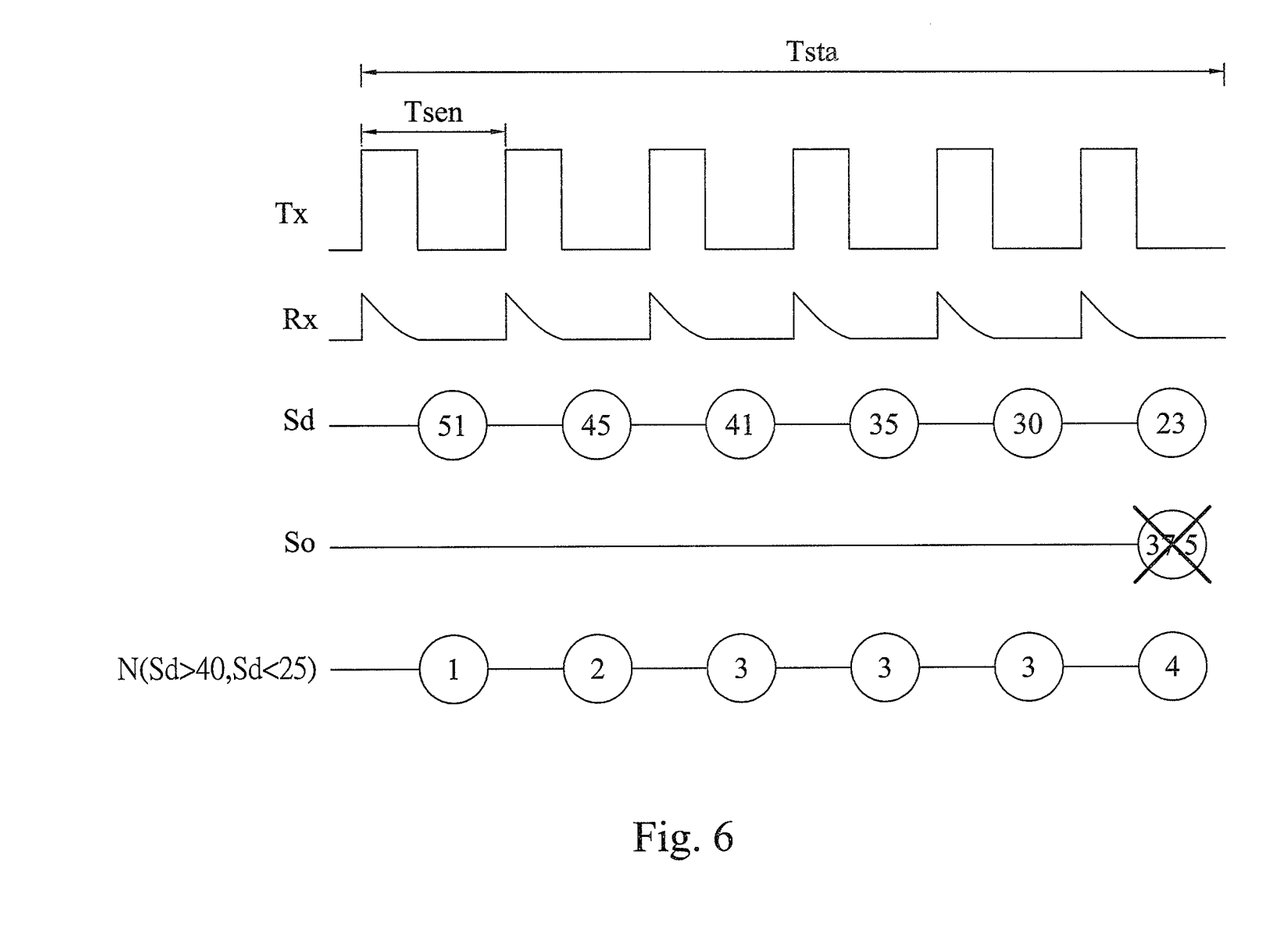

FIGS. 5 and 6 show a first embodiment of a sensing method according to the present invention. The statistical quality indicator 24 shown in FIG. 1 has a defined reasonable range. For example, it has an upper boundary and a lower boundary set as 40 and 25, respectively. The control unit 14 controls the excitation unit 16 and the sampling unit 18 to continuously sense the capacitive touch sensor 26 to generate sensed values Sd. The sensing cycle Tsen is determined based on the sensing frequency. The statistical quality indicator 24 counts the number N of the sensed values Sd that are either larger than the upper boundary 40 (Sd>40) or smaller than the lower boundary 25 (Sd<25) in a statistic cycle Tsta, and then compares the number N to a defined threshold to evaluate the sensing quality. For example, as shown in FIG. 5, a statistic cycle Tsta contains six sensing cycles Tsen, in which the sensed values Sd are 31, 32, 29, 30, 28 and 32, all within the range between the upper boundary 40 and the lower boundary 25. If the defined threshold is 3, then the statistical quality indicator 24 will identify the sensed values Sd in this statistic cycle Tsta as qualified, and the average $$30.3 \left( = \frac{31 + 32 + 29 + 30 + 28 + 32}{6} \right)$$

will be adopted. On the other hand, as shown in FIG. 6, the six sensed values Sd are 51, 45, 41, 35, 30 and 23, four of them outside of the reasonable range between the upper boundary 40 and the lower boundary 25. Since 4>3 (threshold), the statistical quality indicator 24 will identify the sensed values Sd in this statistic cycle Tsta as not qualified, and then trigger a redo signal Sredo to signal the control unit 14 to discard these unqualified sensed values Sd and re-sense the capacitive touch sensor 26.

Figure 7:
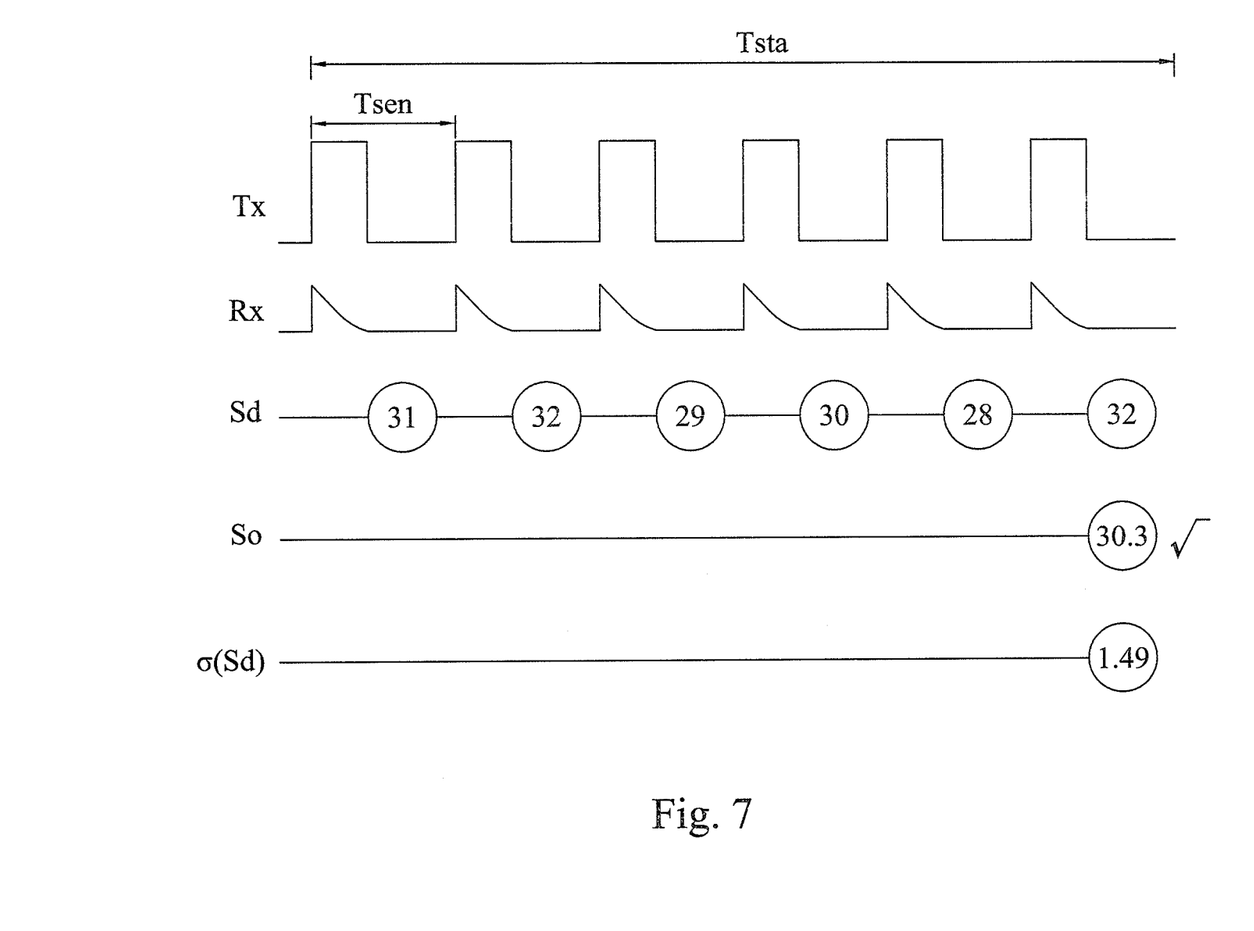
FIGS. 7 and 8 are diagrams illustrating a second embodiment of a sensing method according to the present invention.
Figure 8:
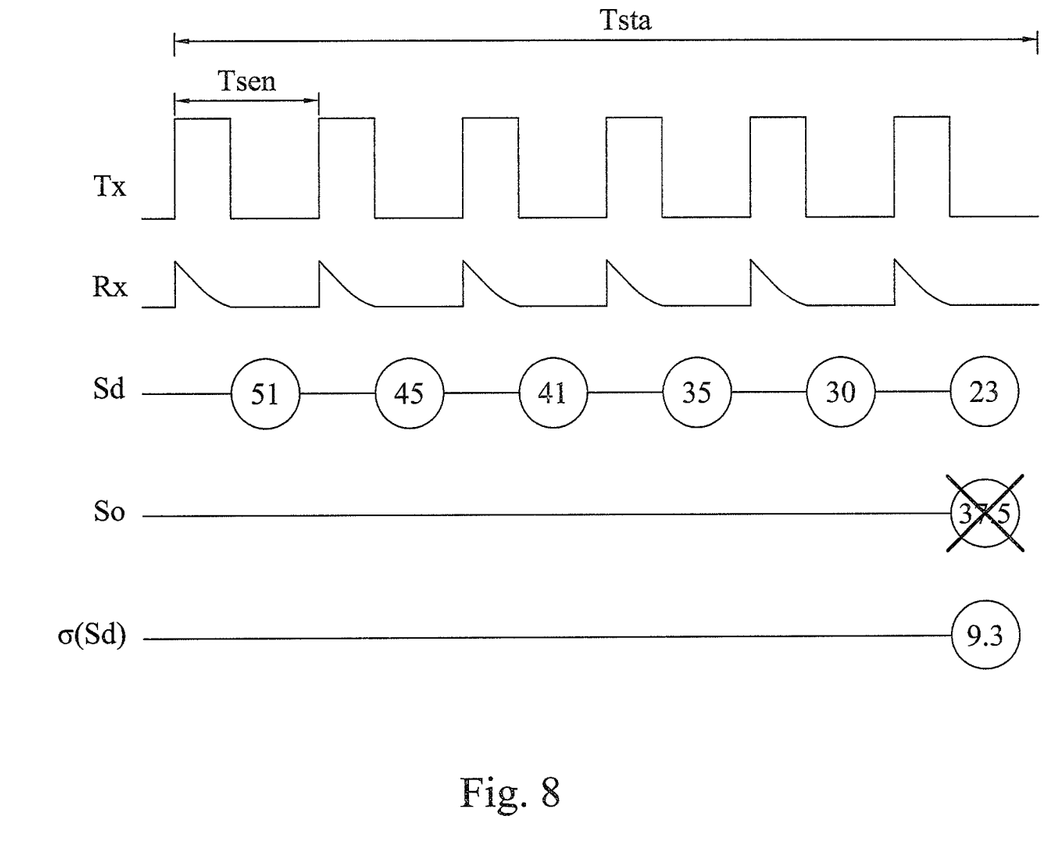

FIGS. 7 and 8 show a second embodiment of a sensing method according to the present invention, by which the statistical quality indicator 24 shown in FIG. 1 calculates the standard deviation σ(Sd) of the sensed values Sd in a statistic cycle Tsta, and compares the standard deviation σ(Sd) to a defined threshold to evaluate the sensing quality. For example, as shown in FIG. 7, the standard deviation σ(Sd) obtained from the six sensed values Sd (31, 32, 29, 30, 28, 32) is 1.49, and as shown in FIG. 8, the standard deviation σ(Sd) obtained from the six sensed values Sd (51, 45, 41, 35, 30, 23) is 9.3. If the defined threshold is 5, then the statistical quality indicator 24 will identify the sensed values Sd shown in FIG. 7 as qualified, and the average 30.3 is adopted; while the statistical quality indicator 24 will identify the sensed values Sd shown in FIG. 8 as not qualified, and trigger a redo signal Sredo to signal the control unit 14 to discard these unqualified sensed values Sd and re-sense the sensing capacitive touch sensor 26. In other words, in this embodiment, the sensing quality is evaluated according to the variation of the sensed values Sd in a statistic cycle Tsta.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A reliability improved sensing apparatus for a capacitive touch device having a capacitive touch sensor, said sensing apparatus comprising:
   an excitation unit connected to said capacitive touch sensor and controlled to apply an excitation signal to said capacitive touch sensor;
   a sampling unit connected to said capacitive touch sensor and controlled to sample and convert sensing signals received from said capacitive touch sensor to generate sensed values;
   a control unit connected to said excitation unit and said sampling unit, operative to control said excitation unit and said sampling unit for timing control based on a sensing frequency; and
   a statistical quality indicator connected to said sampling unit and said control unit, performing statistical analysis to said sensed values in a statistic cycle for evaluating a sensing quality to determine to discard poorly reliable sensed values, wherein the statistical quality indicator determines whether each sensed value exceeds a defined reasonable range and counts a number of said sensed values outside the defined reasonable range in said statistic cycle, and triggers a redo signal for said control unit when said number is larger than a defined threshold.

2. The sensing apparatus of claim 1, wherein said control unit responds to said redo signal to control said excitation unit and said sampling unit to re-sense said capacitive touch sensor.

3. The sensing apparatus of claim 1, wherein said control unit responds to said redo signal to control said excitation unit and said samplin unit to re-sense said capacitive touch sensor with a second sensing frequency.

4. The sensing apparatus of claim 3, wherein said control unit or said statistical quality indicator counts a number of successive rounds that said capacitive touch sensor is re-sensed, and each time said number of successive rounds reaches a preset value, said control unit controls said excitation unit and said sampling unit to re-sense said capacitive touch sensor with another sensing frequency.

5. A reliability improved sensing method for a capacitive touch device having a capacitive touch sensor, said sensing method comprising steps of:

A.) applying an excitation signal to said capacitive touch sensor based on a sensing frequency, sampling and converting sensing signals received from said capacitive touch sensor to generate sensed values; and B.) performing statistical analysis to said sensed values in a statistic cycle for evaluating a sensing quality to determine to discard poorly reliable sensed values, wherein the statistical analysis comprises the steps of:

counting a number of said sensed values outside a defined reasonable range in said statistic cycle;

comparing said number to a defined threshold;

identifying said sensed values in said statistic cycle as not qualified when said number is larger than said defined threshold and re-sensing said capacitive touch sensor.

6. The sensing method of claim 5, wherein the step of re-sensing said capacitive touch sensor is performed until said sensed values are identified as qualified in said step B when said number is larger than said defined threshold.

7. The sensing method of claim 5, wherein the step of re-sensing said capacitive touch sensor is performed with a second sensing frequency when said number is larger than said defined threshold.

8. The sensing method of claim 7, further comprising steps of:

counting a number of successive rounds that said capacitive touch sensor is re-sensed; and re-sensing said capacitive touch sensor with another sensing frequency each time said number of successive rounds reaches a preset value.

* * * * *